Jan. 18, 1949.                D. ARONSON                2,459,302
              CONCENTRATION OF SALTS HAVING MINIMUM
                SOLUBILITIES AT TEMPERATURES ABOVE
                    THOSE OF THE INITIAL SOLUTIONS
                        Filed Dec. 10, 1942
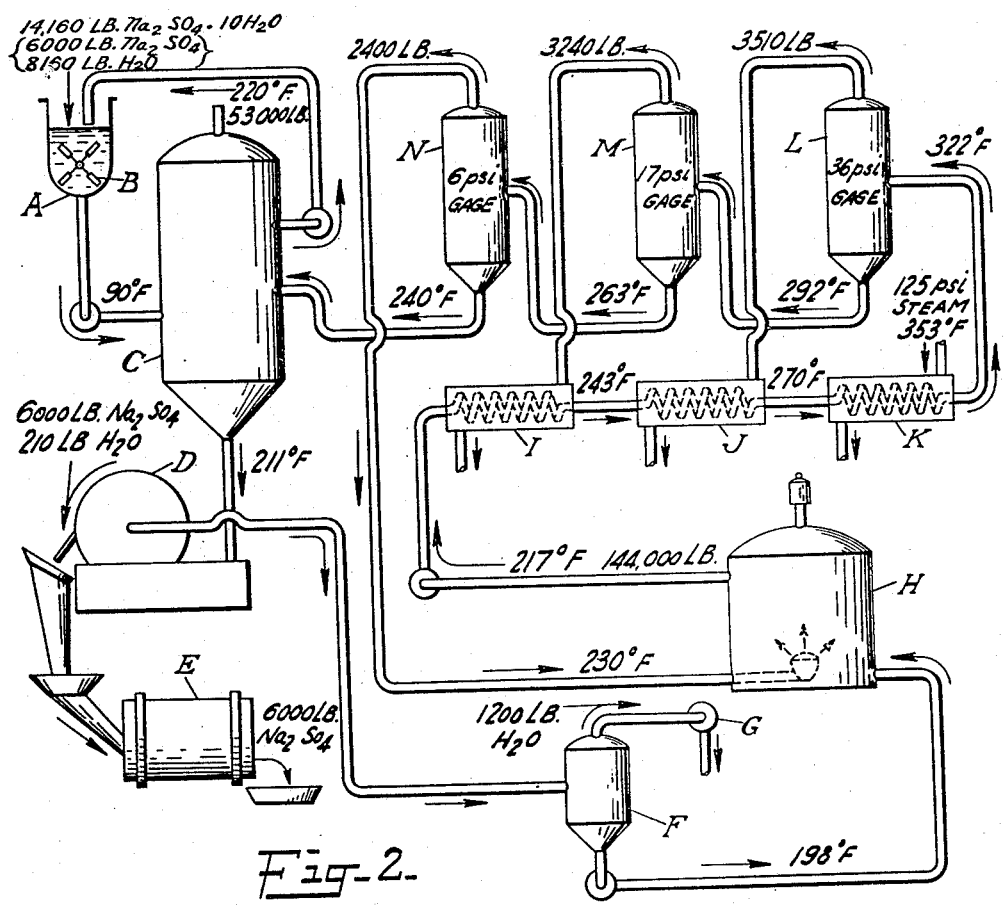
Fig-2-
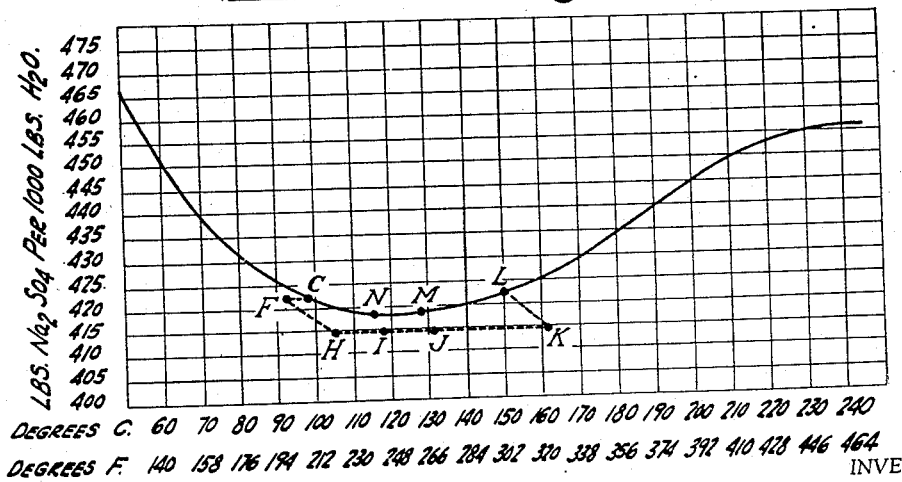
Fig-1-
INVENTOR.
DAVID ARONSON
BY Thomas R. O'Kelley
ATTORNEY.

UNITED STATES PATENT OFFICE 2,459,302

CONCENTRATION OF SALTS HAVING MINIMUM SOLUBILITIES AT TEMPERATURES ABOVE THOSE OF THE INITIAL SOLUTIONS

David Aronson, Pine Bluff, Ark., assignor to American Viscose Corporation, Wilmington, Del., a corporation of Delaware Application December 10, 1942, Serial No. 468,531

15 Claims. (Cl. 23—121)

In the separation of dissolved salts or other solids from the solution in which they are dissolved, by the process of evaporating all or part of the solvent, the heating of the solution to accomplish the required evaporation is often a troublesome operating problem. Present-day evaporator designs and methods of operation have fairly well overcome these difficulties in the cases of dissolved substances whose solubility in the solvent increases with increasing temperature. On the other hand, when evaporating solutions of substances whose solubility decreases with increasing temperature it has thus far been extremely difficult, if not impossible, to avoid encrustation of the solids on the surfaces through which the heat required for evaporation is supplied. This encrustation reduces the efficiency of heat transfer and requires stopping the process for removal of the caked solids.

The present invention discloses methods of accomplishing the desired evaporation of solutions of certain of these salts or dissolved solids in such a manner that the difficulties encountered in previous methods of operations are avoided.

The solubility of certain of these salts or solids, while decreasing with temperature beyond a certain point, finally reaches a minimum and then the solubility increases with temperature. This invention relates to the separation of such solutes as have the characteristic of dissolving to a greater extent at temperatures both higher and lower than a certain temperature which is hereinafter termed the "point of minimum solubility" even though there may be other temperatures at which the solute is less soluble than at the so-called point of minimum solubility. The invention discloses methods of operating at such temperatures and concentrations as to take advantage of the so-called minimum solubility characteristic of the solute. The invention describes methods of utilizing this property for the attainment of efficient and trouble-free operation.

While the recovery of anhydrous sodium sulfate, which has a point of minimum solubility in water, will be used as a basis for discussion, this is to be considered merely illustrative as the process is applicable to any salt or solid having similar solubility characteristics as well as to any salt or solid having an essentially flat solubility curve, that is, whose solubility does not change appreciably with change in temperature of the solution. In the description hereinafter, reference will be made to the drawing which is illustrative of the invention and in which:

Figure 1 shows a cycle of the invention superimposed upon the solubility curve of the anhydrous sodium sulfate, and Figure 2 shows a preferred embodiment of the invention in the form of a flow sheet.

Referring to Figure 1, the ordinates represent the concentration in terms of pounds of sodium sulfate per 1000 pounds of water while the abscissae represent temperatures for which both a Centigrade and Fahrenheit scale are provided. As appears from the graphical representation, the solubility of sodium sulfate decreases up to a temperature of about 250° F. whereas beyond this point the solubility increases with increase in temperature at least up to about 400° F.

In the following description and in the claims, the expressions "heat exchanger" or "heat interchanger" are intended to refer to that type of equipment in which heat transfer occurs between two fluid masses, whether gases, vapors, liquids, solution, emulsions, dispersions, or suspensions, which are separated by an impermeable wall and to exclude from their meaning the type of equipment in which the heating of one fluid mass is effected by the direct introduction of another fluid mass, such as steam, into the first mass, although the latter type of equipment is frequently referred to as a heat exchanger by the workers in the art.

In accordance with one form of the invention, a sodium sulfate solution at a temperature above its transition point is heated by the direct introduction of steam which may then be followed by evaporation, such as under reduced pressure, or by further heating by means of heat exchangers with simultaneous and/or subsequent evaporation, such as under reduced pressure. The choice of these alternatives depends upon the conditions of operation and will be more fully explained hereinbelow. After evaporation, the solution is mixed with the hydrated salt in a suitable precipitator or thickener and the anhydrous salt which is thrown down therein is filtered. The filtrate is recirculated in the system, that is, it constitutes the above-mentioned sodium sulfate solution into which steam is introduced.

Under operating conditions such that the loss in temperature by the filtrate is appreciable from the time it leaves the filter to the time it reaches the vessel where steam is introduced, the solution will no longer be saturated at the latter stage because at the lower temperature, the salt has a greater solubility. Depending upon the quality of the steam introduced, the concentration of the solution will follow a path which may either diverge or converge more or less with respect to the saturation curve shown in Figure 1. The introduction of the steam, preferably wet or only moderately superheated, effects simultaneously the heating and dilution of the solution and where conditions are such that the path followed by the solution upon the introduction of the steam is divergent from the saturation curve shown in Figure 1, it may be permissible and desirable to effect further heating by heat exchange elements before applying a reduced pressure to effect evaporation. The divergent character of the path with respect to the saturation curve of Figure 1 makes it feasible to apply heat by means of heat exchanging surfaces since the application of heat in this manner need not be accompanied with such excessive precautions as would ordinarily be necessary to prevent caking. When the dilution produced by the introduction of the steam has not been sufficient in amount to bring the concentration below about 418 pounds of sodium sulfate per 1000 pounds of water and the temperature of the solution after the introduction of the steam is below about 250° F., this procedure is circumscribed to the extent that the conditions within the heat exchanger should be such as to keep the entire solution safely below its boiling point and safely below the temperature of saturation. Where the dilution effected by the introduction of the steam is sufficient to take the concentration below about 418 pounds of sodium sulfate per 1000 pounds of water and the solution is maintained under sufficient pressure to prevent boiling below 250° F., any amount of heating may be performed by heat exchangers and the temperature of the heat exchanging surface is not limited by the considerations just stated. After the solution has been heated sufficiently, evaporation under reduced pressure is effected until an amount of water is removed corresponding to the amount of water introduced by the Glauber's salt in the precipitator and the steam. If desired, additional heating may be performed by heat exchangers during evaporation, keeping the temperature of the solution above about 250° F.

As an alternative of the preceding embodiment, the character of the steam introduced into the filtrate may be selected with relation to its concentration and its temperature to cause it to follow a path which converges with respect to the solubility curve of Figure 1. In fact, the convergence may be made so great that the path followed by the heated solution actually may cross the solubility curve. When sufficient heat has been introduced in this manner, no additional heating by heat exchange need be imparted, but the heating process may be followed immediately by evaporation under reduced pressure to remove an amount of vapor corresponding to the sum of the amount of water introduced by the Glauber's salt in the precipitator and the diluting steam. In both of these processes, the mass or material, whether slurry or solution, remaining after the evaporation of the amount of water desired is recycled and mixed with additional Glauber's salt in the precipitator, throwing down anhydrous sodium sulfate which is filtered, the filtrate being sent through the cycle as described.

In a preferred embodiment, the filtrate is heated by the direct introduction of steam until it is diluted to a concentration below about 418 pounds of sodium sulfate per 1000 pounds of water. Thereupon further heat is introduced into the solution by heat exchangers so that heating is effected without concomitant dilution. In Figure 1, it will appear that such a solution is not and does not become saturated even at the temperature of minimum solubility at about 250° F. The only precaution that need be taken during this heating is that such pressure be maintained on the solution that no boiling be allowed to take place at temperatures below about 250° F. Preferably, the heating is allowed to occur in this manner until a temperature considerably above 250° F. is attained by the solution. Thereafter, the pressure on the solution is reduced so that evaporation is effected, the amount of which is controlled to correspond to the amount of water in the Glauber's salt introduced at the precipitation stage in the cycle plus that introduced as steam into the original solution. Preferably, though not necessarily, the temperature of the solution is raised to a point such that after evaporation of the amount of water desired, the resulting mass is still at a high temperature in the neighborhood of about 250° F. in order to obtain a high temperature in the precipitator to achieve a high crystallization efficiency. Alternatively, the temperature may be considerably lower but above about 250° F. and heating may be performed by heat exchange surfaces during evaporation so that during such heating and evaporation the temperature of the mass is kept above about 250° F. This mass is then mixed with additional Glauber's salt to cause precipitation of the anhydrous sodium sulfate. This slurry is then filtered and the filtrate is put through the same cycle of introduction of steam, heating further by heat exchangers, evaporation, and so on.

In the preferred procedure just described, all chance of caking is eliminated since all heating of the solution when it has a concentration above that of its minimum solubility at about 250° F. is performed with concomitant dilution and the heating by heat exchangers (without concomitant dilution) is only performed on the solution when its concentration is below that of its minimum solubility of 250° F. Besides eliminating all possibility of caking in the preferred procedure, this procedure also is characterized by performance of the filtration on a portion of the solubility curve of Figure 1 to the left of its minimum solubility at about 250° F. so that as the solution tends to cool during filtration, the salt actually becomes more soluble and all tendency to crystallize in the filter and thereby plug up the filter is eliminated. In this procedure, the temperature of precipitation, the temperature of filtration, and the final temperature of heating before evaporation, may vary widely and may be controlled by various factors, such as the capacity of the various parts of the equipment which controls the amount of material to be cycled. For practical purposes, however, it is preferred to control these factors in such a manner that the temperature of the filtrate is as close to a point just below 250° F. as is consistent with a reasonable amount of heating equipment to bring the filtrate up to a temperature sufficient to permit subsequent evaporation of the desired amount of water. By maintaining the temperature of the filtrate as just suggested, a reduced quantity of steam is necessary in the initial heating step to bring the concentration of the solution below the minimum solubility. Since the amount of steam thus directly introduced has to be removed subsequently by evaporation in addition to the amount of water in the Glauber's salt introduced into the precipitator, a considerable saving in equipment and expense is involved in maintaining the filtrate temperature as high as possible but without exceeding about 250° F.

A third modification of the invention is to maintain the conditions such that filtration occurs at a temperature above about 250° F. In such event, no introduction of steam to effect dilution simultaneous with the heating need be applied but heat exchangers may be used to raise the temperature of the filtrate to the desired temperature prior to evaporation. The chief disadvantage of such a procedure is that a certain amount of pressure must be maintained on all of the equipment, even the filtering equipment. However, this disadvantage is offset to a degree by the fact that no steam need be directly introduced into the filtrate to effect a dilution before heating with heat exchangers. Therefore, additional water vapor need not be removed during the subsequent evaporation but only the amount that is introduced by the Glauber's salt itself.

Figure 2 illustrates a preferred embodiment of the procedure after equilibrium conditions have been attained. The Glauber's salt is mixed with agitation with the hot slurry of anhydrous sodium sulfate coming from the evaporation step. This mixing may be partially accomplished in the repulper A which is provided with a suitable agitator B and the resulting mixture is pumped into a suitable precipitator, in the form of a thickener and mixer C. Suitable agitation is provided for obtaining thorough mixing and satisfactory crystal growth. The slurry containing anhydrous sodium sulfate suspended therein at a temperature of about 211° F. proceeds from the precipitator to the filter D. Of course, any equivalent means, such as a centrifuge may be substituted for the filter. The anhydrous sodium sulfate containing a small amount of water is directed into a suitable drier, such as the rotary drier E, which removes the remaining water and discharges the anhydrous sodium sulfate product. The filtrate from the filter proceeds to a suitable air separator F which is interposed between the filter and the vacuum pump G to permit separation of the air and the liquid. As shown, an appreciable amount of water vapor may also be removed by the vacuum pump. If so, its removal requires control to prevent oversaturation. The filtrate then proceeds to a vessel H in which a certain proportion of steam is introduced. The diluted solution is then pumped through a series of heat exchangers I, J, and K in each of which its temperature is boosted to successively higher temperatures as shown. The heated solution is then introduced into the first of a series of evaporators. In the first evaporator L, evaporation is allowed to take place under a gage pressure of about 36 pounds per square inch. The slurry at about 292° F. proceeds to the second evaporator M where evaporation is allowed to occur at about 17 pounds per square inch gage, the slurry at a temperature of about 263° F. proceeding to a third evaporator N in which evaporation is allowed to take place at 6 pounds per square inch gage, the slurry resulting from the last evaporation then proceeding to the precipitator where it is again mixed with additional Glauber's salt and recycled. As shown in the drawing, suitable connections are preferably provided so that the water vapor removed in the evaporation stages may be used in heat interchange relationship with the filtrate. The water vapor coming from the third evaporator N constitutes the steam introduced directly into the filtrate in the heater H. The water vapor removed by the second stage evaporator M proceeds to the first exchanger I and the water vapor removed in the first stage evaporator L proceeds to the second heat exchanger J. Steam at 125 pounds per square inch gage coming from an outside source may be supplied to the third heat exchanger K to boost the temperature to the final desired point.

The various weights shown on Figure 2 represent an illustrative material balance rate for continuous operation and it should be understood that both the quantities and the temperatures specifically enumerated are merely illustrative and that within the scope of the description hereinabove they may be considerably varied.

The cycle of the process illustratively embodied in the flow sheet of Figure 2 may be represented roughly by the dotted line path of Figure 1. It should be noted that this cycle is merely a rough and qualitative representation of the cycle of Figure 2 and that the dotted lines are not intended to show the exact path followed between successive points nor are the locations of the points themselves to be considered exact. Saturated slurry discharged from the precipitator C falls roughly upon the saturation curve at about 211° F. and in proceeding to the separator F, since cooling takes place and a small amount of water is removed by the vacuum pump, the filtrate follows a path from C to F on Figure 1. The introduction of steam in the vessel H moves the solution along a path from F to H on Figure 1 which shows the effect of both dilution and heating. The thus diluted solution proceeds from H to I, J, K, on Figure 1 corresponding to the temperatures imparted by the corresponding heat exchangers of Figure 2. Evaporation in the first stage causes the solution to follow a path from the point K to the point L of Figure 1 in the evaporator and some precipitation of anhydrous salt occurs. From point L of Figure 1, the solution follows a path along the solubility curve to M and N respectively in the subsequent evaporators in which further salt is precipitated. The solution goes from the last evaporator into the precipitator where it is mixed with additional Glauber's salt and then proceeds from point N to C.

The source of the Glauber's salt which may be used in the conversion process of the invention is immaterial. In case the salt should be acid or alkaline in character, such as the acid salt that is recovered from used spinning baths in processes of making viscose, an amount of alkali or acid may be added in the repulper to neutralize the excess acid or alkali therein respectively.

As stated above, the invention is applicable to other salts whose solubility characteristics include a point of minimum solubility. As another example, the process can be modified as to temperature and pressure conditions and applied to the separation of anhydrous strontium acetate from aqueous solutions. The transition temperature between the tetrahydrate and the anhydrous salt is at about 10° C. (50° F.) and the anhydrous salt decreases in solubility from this temperature to about 80° C. (176° F.) where there is a minimum solubility of about 361 pounds of the salt per 1000 pounds of water. Similarly, the process can be applied to the separation of calcium propionate from its aqueous solutions. The solubility of this salt in water decreases from approximately 423 pounds per 1000 pounds of water at about 0° C. to a minimum of approximately 381 pounds per 1000 pounds of water at about 55° C. (131° F.) above which temperature it again rises rapidly. The procedure of the invention is not restricted to any particular kind of solute or solvent. Other solutes than salts, such as acids, bases, oxides, organic compounds, such as esters, amines, acids, phenols, alcohols, ketones, aldehydes, which have a minimum solubility in any particular solvent may be recovered in this manner. Similarly, the procedure is applicable to solutions in other solvents besides water, such as liquid ammonia, liquid sulfur dioxide, as well as any of the organic type of solvents, in which a particular material shows a minimum solubility. Illustratively, the process may be applied to the separation of tin iodide ($SnI_2$) from its aqueous hydrogen iodide solutions. For example, the solubility of tin iodide decreases from approximately 253 pounds per 1000 pounds of 36.8% HI solution in water at about 20° C. to a minimum of approximately 231.5 per pounds per 1000 pounds of HI solution at about 38° C. above which temperature it again rises.

In dealing with a simple solution of a solute in a solvent, the cycle illustrated with sodium sulfate is modified to the extent that instead of introducing the decahydrate of sodium sulfate into the precipitator as the initial or raw material, the particular solution involved is introduced at this point. Also the temperature and pressure conditions are modified to the extent necessitated by the difference between the temperatures of minimum solubility of the sodium sulfate and the other solute. The amount of steam introduced directly into the solution depends on considerations entirely analogous to those set forth with respect to sodium sulfate. Where a solvent other than water is involved, instead of effecting simultaneous dilution and heating by the introduction of steam, the same effect is obtained by direct introduction of heated solvent which may be either in liquid, gaseous or vaporous form or it may be a vapor containing entrained liquid, depending upon the difference in the boiling point of the solvent and the temperature of minimum solubility of the solute therein, taking into consideration the pressure of operation where necessary.

While preferred embodiments have been disclosed, the description is intended to be illustrative only, and it is to be understood that changes and variations may be made without departing from the spirit and scope of the invention as defined by the appended claims.

I claim:

1. The process of separating a solute from a solution thereof in a solvent in which the solute has solubility characteristics including a point of minimum solubility corresponding to a temperature above that of the initial solution and a concentration less than that of the initial solution and having increasing solubility with increasing temperature above the point of minimum solubility comprising diluting the solution to a solute concentration less than that corresponding to its minimum solubility and heating the solution while maintaining the concentration below saturation to a temperature above that corresponding to its minimum solubility, and then evaporating at least sufficient solvent therefrom that crystallization of the solute would normally occur on changing its temperature to the point of minimum solubility.

2. The process of concentrating a solution of a solute in a solvent in which the solute has solubility characteristics including a point of minimum solubility corresponding to a temperature above that of the initial solution and a concentration less than that of the initial solution and having increasing solubility with increasing temperature above the point of minimum solubility comprising diluting the solution to a solute concentration less than that corresponding to the point of minimum solubility and heating the solution while maintaining the concentration below saturation to a temperature above the temperature corresponding to the point of minimum solubility and then evaporating at least sufficient solvent therefrom at a temperature above that corresponding to the point of minimum solubility while simultaneously supplying heat through heat transfer surfaces that crystallization of the solute would normally occur on changing its temperature to the point of minimum solubility.

3. The process of concentrating sodium sulfate solution comprising the steps of diluting the solution to a concentration of less than about 418 pounds of salt per 1000 pounds of water, heating the solution while maintaining the concentration below saturation to avoid crystallization to a temperature above about 250° F. and then evaporating at least sufficient solvent therefrom that crystallization would occur on changing its temperature to 250° F.

4. The process of concentrating a solution of a solute in a solvent in which the solute has solubility characteristics including a point of minimum solubility corresponding to a temperature above that of the initial solution and a concentration less than that of the initial solution and having increasing solubility with increasing temperature above the point of minimum solubility comprising introducing into the solution more of the solvent having a higher temperature than the solution to effect a dilution thereof to a solute concentration less than that corresponding to its minimum solubility and heating the solution while maintaining the concentration below saturation to a temperature above that corresponding to its minimum solubility and then evaporating at least sufficient solvent therefrom that crystallization of the solute would normally occur on changing its temperature to the point of minimum solubility.

5. The process of concentrating an aqueous solution of a salt having solubility characteristics in water including a point of minimum solubility corresponding to a temperature above that of the initial solution and a concentration less than that of the initial solution and having increasing solubility with increasing temperature above the point of minimum solubility comprising the steps of introducing steam into the solution to simultaneously effect heating and dilution thereof to a concentration less than that corresponding to the minimum solubility of the salt, heating the solution while maintaining the concentration below saturation to a temperature above that corresponding to its minimum solubility and then evaporating at least sufficient water that crystallization of the salt would normally occur on changing its temperature to the point of minimum solubility.

6. The process of separating a solute from a solution thereof in a solvent in which the solute has solubility characteristics including a point of minimum solubility corresponding to a temperature above that of the initial solution and a concentration less than that of the initial solution and having increasing solubility with increasing temperature above the point of minimum solubility comprising introducing into the solution more of the solvent having a higher temperature than the solution to simultaneously effect heating and dilution thereof to a solute concentration less than that corresponding to its minimum solubility and heating the solution while maintaining the concentration below saturation to a temperature above that corresponding to its minimum solubility, then evaporating at least sufficient solvent therefrom that crystallization of the solute would normally occur on changing its temperature to the point of minimum solubility, mixing the mass resulting from the evaporation with more of the first-mentioned solution, filtering out the precipitate, and repeating the cycle using the filtrate as the first-mentioned solution.

7. In a process of producing anhydrous strontium acetate, the steps of introducing steam into a solution of strontium acetate to simultaneously effect heating and dilution thereof to a concentration of less than about 361 pounds of salt per 1000 pounds of water, heating the solution while preventing it from becoming saturated to above about 176° F., then evaporating at least sufficient of the water therefrom that crystallization would occur on changing its temperature to 176° F., mixing the mass resulting from the evaporation with additional strontium acetate solution of approximately the same temperature and concentration as the initial solution of strontium acetate, filtering out the anhydrous salt precipitated, controlling the temperatures in the various steps so that filtration occurs at a temperature below about 176° F. but substantially above about 50° F., and repeating the cycle with the filtrate.

8. In a process of producing from a hydrated salt an anhydrous salt which exhibits decreased solubility in a temperature range above its transition temperature from the hydrated salt, a point of minimum solubility above that range, and increasing solubility with increasing temperature above the point of minimum solubility, the steps of forming an aqueous solution of the salt having a concentration less than that corresponding to its point of minimum solubility, heating the solution while maintaining the concentration below saturation to a temperature above that corresponding to the point of minimum solubility, then evaporating, mixing the mass resulting from the evaporation with the hydrated salt, filtering off the anhydrous salt precipitated, and repeating the cycle except for the step of forming the aqueous salt solution using the filtrate as the first-mentioned solution.

9. In a process of producing from a hydrated salt an anhydrous salt which exhibits decreasing solubility as the temperature increases in a temperature range above its transition temperature from the hydrate, a point of minimum solubility above that range, and increasing solubility with increasing temperature above the point of minimum solubility, the steps of introducing steam into an aqueous solution of the salt to simultaneously effect heating and dilution thereof to a concentration less than that corresponding to the point of minimum solubility, heating the solution while maintaining the concentration below saturation to a temperature above that corresponding to the point of minimum solubility, then evaporating at least sufficient water therefrom that crystallization of salt would normally occur on changing its temperature to the point of minimum solubility, mixing the mass resulting from the evaporation with the hydrated salt, filtering off the anhydrous salt precipitated, controlling the temperatures in the various steps so that filtration occurs at a temperature below that corresponding to the minimum solubility point but substantially above the transition temperature, and repeating the cycle using the filtrate as the first-mentioned aqueous solution.

10. In a process of producing anhydrous sodium sulfate from a hydrated sodium sulfate, the steps of mixing the hydrated salt with a heated concentrated solution of sodium sulfate to bring the mixture to a temperature substantially above the transition temperature of the hydrated to the anhydrous salt and thereby precipitating the anhydrous salt, filtering off the anhydrous salt, heating the filtrate by the direct introduction of steam until a concentration of less than about 408 pounds of salt per 1000 pounds of water is attained, further heating it without dilution and without ebullition to a temperature above about 250° F., evaporating at least sufficient water from it to reduce it to a concentration corresponding approximately to that of said heated solution, and returning the evaporated filtrate for mixing with additional hydrated salt.

11. In a process of producing anhydrous sodium sulfate from a hydrated sodium sulfate, the steps of mixing the hydrated salt with a heated concentrated solution of sodium sulfate to bring the mixture to a temperature substantially above the transition temperature of the hydrated to the anhydrous salt and thereby precipitating the anhydrous salt, filtering off the anhydrous salt, diluting the filtrate until a concentration of less than about 418 pounds of salt per 1000 pounds of water is attained, heating it by transfer of heat through a heat transfer surface while maintaining the concentration below the limiting concentration specified, evaporating at least sufficient water from it to reduce it to a concentration corresponding approximately to that of the first-mentioned heated solution, and returning the evaporated filtrate for mixing with additional hydrated salt.

12. In a process of producing anhydrous sodium sulfate from a hydrated sodium sulfate, the steps of mixing the hydrated salt with a heated concentrated solution of sodium sulfate to bring the mixture to a temperature substantially above the transition temperature of the hydrated to the anhydrous salt, thereby precipitating the anhydrous salt, filtering off the anhydrous salt, heating and diluting the filtrate by the direct introduction of steam until a concentration of less than about 418 pounds of salt per 1000 pounds of water is attained, further heating it by transfer of heat through a heat transfer surface to a temperature above 250° F. while maintaining the concentration below saturation, evaporating at least sufficient water therefrom that crystallization would occur on changing its temperature to 250° F., and returning the mass resulting from the evaporation for mixing with additional hydrated salt.

13. In a process of producing anhydrous sodium sulfate from a hydrated sodium sulfate, the steps of diluting an aqueous solution of sodium sulfate to a concentration of less than about 418 pounds of salt per 1000 pounds of water, heating the solution while preventing it from becoming saturated to a temperature above 250° F., then evaporating at least sufficient water therefrom that crystallization would occur on changing its temperature to 250° F., mixing the mass resulting from the evaporation with the hydrated sodium sulfate and thereby precipiting the anhydrous salt, filtering off the anhydrous sodium sulfate, controlling the temperatures in the various steps so that filtration occurs at a temperature below about 250° F. but substantially above the transition temperature, and repeating the cycle using the filtrate as the first-mentioned solution.

14. In a process of producing anhydrous sodium sulfate from a hydrated sodium sulfate, the steps of introducing steam into a solution of sodium sulfate to simultaneously effect heating and dilution thereof to a concentration of less than about 418 pounds of salt per 1000 pounds of water, heating the solution while maintaining the concentration below saturation to a temperature above 250° F., and then evaporating at least sufficient water therefrom that crystallization would occur on changing its temperature to 250° F., mixing the mass resulting from the evaporation with the hydrated sodium sulfate and thereby precipitating the anhydrous salt, filtering out the anhydrous sodium sulfate, controlling the temperatures in the various steps so that filtration occurs at a temperature below about 250° F. but substantially above the transition temperature, and repeating the cycle using the filtrate as the first-mentioned solution.

15. In the process of producing anhydrous sodium sulfate from a hydrated sodium sulfate, the steps of mixing a concentrated solution of sodium sulfate with the hydrated salt and controlling the conditions of the mixing so that the temperature of the resulting slurry is about 250° F., thereby precipitating the anhydrous salt, filtering off the anhydrous sodium sulfate under pressure to prevent ebullition at a temperature of at least about 250° F., heating and evaporating the filtrate under sufficient pressure to maintain the temperature of the evaporated slurry sufficiently above about 250° F. to permit mixing with additional hydrated sodium sulfate without lowering the temperature of the mixture below about 250° F., evaporating at least sufficient water therefrom that crystallization would occur on changing its temperature to 250° F., and then repeating the cycle by mixing the mass resulting from the evaporation with additional hydrated sodium sulfate.

DAVID ARONSON.

REFERENCES CITED

The following references are of record in the file of this patent:

UNITED STATES PATENTS

| Number | Name | Date |
|---|---|---|
| 685,792 | Pemberton | Nov. 5, 1901 |
| 1,006,823 | Block | Oct. 24, 1911 |
| 1,927,555 | Oetkin | Sept. 19, 1933 |
| 2,249,192 | Titlestad et al. | July 15, 1941 |
| 2,344,408 | Kalous | Mar. 14, 1944 |

FOREIGN PATENTS

| Number | Country | Date |
|---|---|---|
| 325,650 | Great Britain | Feb. 27, 1930 |
| 431,812 | Great Britain | July 16, 1935 |
| 695,508 | France | Sept. 30, 1930 |